United States Patent
Karri et al.

(10) Patent No.: US 11,537,115 B2
(45) Date of Patent: Dec. 27, 2022

(54) DIGITAL REPLICA BASED SIMULATION TO PREDICT PREVENTATIVE MEASURES AND/OR MAINTENANCE FOR AN INDUSTRIAL LOCATION

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 89 days.

(21) Appl. No.: 17/034,491

(22) Filed: Sep. 28, 2020

(65) Prior Publication Data

US 2022/0100185 A1    Mar. 31, 2022

(51) Int. Cl.
G05B 23/02    (2006.01)

(52) U.S. Cl.
CPC ..... *G05B 23/0243* (2013.01); *G05B 23/0229* (2013.01); *G05B 23/0237* (2013.01); *G05B 23/0283* (2013.01)

(58) Field of Classification Search
CPC ............ G05B 23/0243; G05B 23/0229; G05B 23/0237; G05B 23/0283
USPC ......................................................... 700/29
See application file for complete search history.

(56) References Cited

U.S. PATENT DOCUMENTS

| | | | | |
|---|---|---|---|---|
| 7,353,120 | B2* | 4/2008 | Enta | H01L 22/14 257/E21.531 |
| 2009/0309604 | A1 | 12/2009 | Zhang | |
| 2014/0337000 | A1* | 11/2014 | Asenjo | G06Q 10/06 703/13 |
| 2016/0179993 | A1* | 6/2016 | Maturana | G06F 30/20 703/7 |

FOREIGN PATENT DOCUMENTS

| | | |
|---|---|---|
| EP | 2056689 A1 | 5/2009 |
| KR | 100853127 B1 | 8/2008 |

OTHER PUBLICATIONS

"Beware of Static Electricity Generated by Flowing Liquids", Shimadzu, retrieved from the Internet Jun. 30, 2020, 4 pages, <https://www.shimadzu.com/an/hplc/support/lib/lctalk/14/14lab.html>.

"Electrostatic generator", Wikipedia, 6 pages, This page was last edited on Jun. 4, 2020, <https://en.wikipedia.org/wiki/Electrostatic_generator>.

(Continued)

*Primary Examiner* — Rocio Del Mar Perez-Velez
*Assistant Examiner* — Christopher W Carter
(74) *Attorney, Agent, or Firm* — Stephanie L. Carusillo (57) ABSTRACT

Methods, computer program products and/or systems are provided that perform the following operations: obtaining digital replica models for equipment at an industrial location; receiving data feeds associated with the equipment; simulating operations of the equipment based on the digital replica models and the data feeds; predicting one or more events associated with areas within the industrial location (Continued)

based, at least in part, on the simulating of operations of the equipment; and determining one or more mitigation procedures based on the one or more predicted events.

17 Claims, 3 Drawing Sheets

(56) References Cited

OTHER PUBLICATIONS

"Generation and Control of Static Electricity", SRBrowne, retrieved from the Internet on Jun. 30, 2020, 1 page. <http://www.srbrowne.com/booklet/page01.html>.

"IBM Maximo Asset Performance Management", IBM Watson IoT, retrieved from the Internet Jun. 30, 2020, 3 pages.

"New technique for generating electricity from mechanical vibrations", New Atlas, Nov. 12, 2014, 6 pages, <https://newatlas.com/mechanical-vibration-generate-electricity/34701/>.

Bevilacqua et al., "Digital Twin Reference Model Development to Prevent Operators' Risk in Process Plants", MDPI, Sustainability 2020, 12, 1088, 17 pages, doi:10.3390/su12031088.

Zhao et al., "Analysis of Static Electricity Generated in Petroleum Pipeline Transportation Based on the Generalized Gray Incidence Model", Chemical Engineering Transactions, vol. 55, 2016, pp. 223-228, DOI: 10.3303/CET1655038.

* cited by examiner

DIGITAL REPLICA BASED SIMULATION TO PREDICT PREVENTATIVE MEASURES AND/OR MAINTENANCE FOR AN INDUSTRIAL LOCATION

BACKGROUND

The present invention relates generally to the field of digital modeling, and more particularly to providing for the utilization of digital replicas (e.g., "digital twin" modeling) in predicting and/or prioritizing shop floor mitigation, preventative measures, and/or maintenance.

A digital twin provides an exact virtual/digital replica of a physical entity (e.g., machine, product, system, process, service, and/or the like) creating a link between the physical and digital worlds. A digital twin can enable simulation, testing, modeling, analysis, and/or monitoring based on data generated by and/or collected from the digital twin.

SUMMARY

According to an aspect of the present invention, there is a method, computer program product and/or system that performs the following operations (not necessarily in the following order): obtaining digital replica models for equipment at an industrial location; receiving data feeds associated with the equipment; simulating operations of the equipment based on the digital replica models and the data feeds; predicting one or more events associated with areas within the industrial location based, at least in part, on the simulating of operations of the equipment; and determining one or more mitigation procedures based on the one or more predicted events.

DETAILED DESCRIPTION

According to aspects of the present disclosure, systems and methods can be provided utilizing digital replica (e.g., digital twin) simulations to generate predictions and/or determinations regarding events in an industrial setting (e.g., shop floor, etc.) that may necessitate mitigation, preventive measures, and/or maintenance operations. A digital replica (e.g., digital twin) model provides a virtual/digital replica or representation of a physical entity (e.g., machine, product, system, process, service, and/or the like) creating a link between the physical and digital worlds. In particular, systems and methods of the present disclosure can provide for digital replica (e.g., digital twin) simulations of equipment, processes, activities, and/or the like in industrial locations. The systems and methods of the present disclosure can generate, based on the digital replica (e.g., digital twin) simulations, predictions with regard to events (e.g., static electricity generation, leaks, accidents, etc.) that may be occur in association with the equipment, systems, processes, activities, and/or the like at the location. The systems and methods can determine, prioritize, and/or initiate mitigation, preventive measures, and/or maintenance activities in response to the predicted events.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
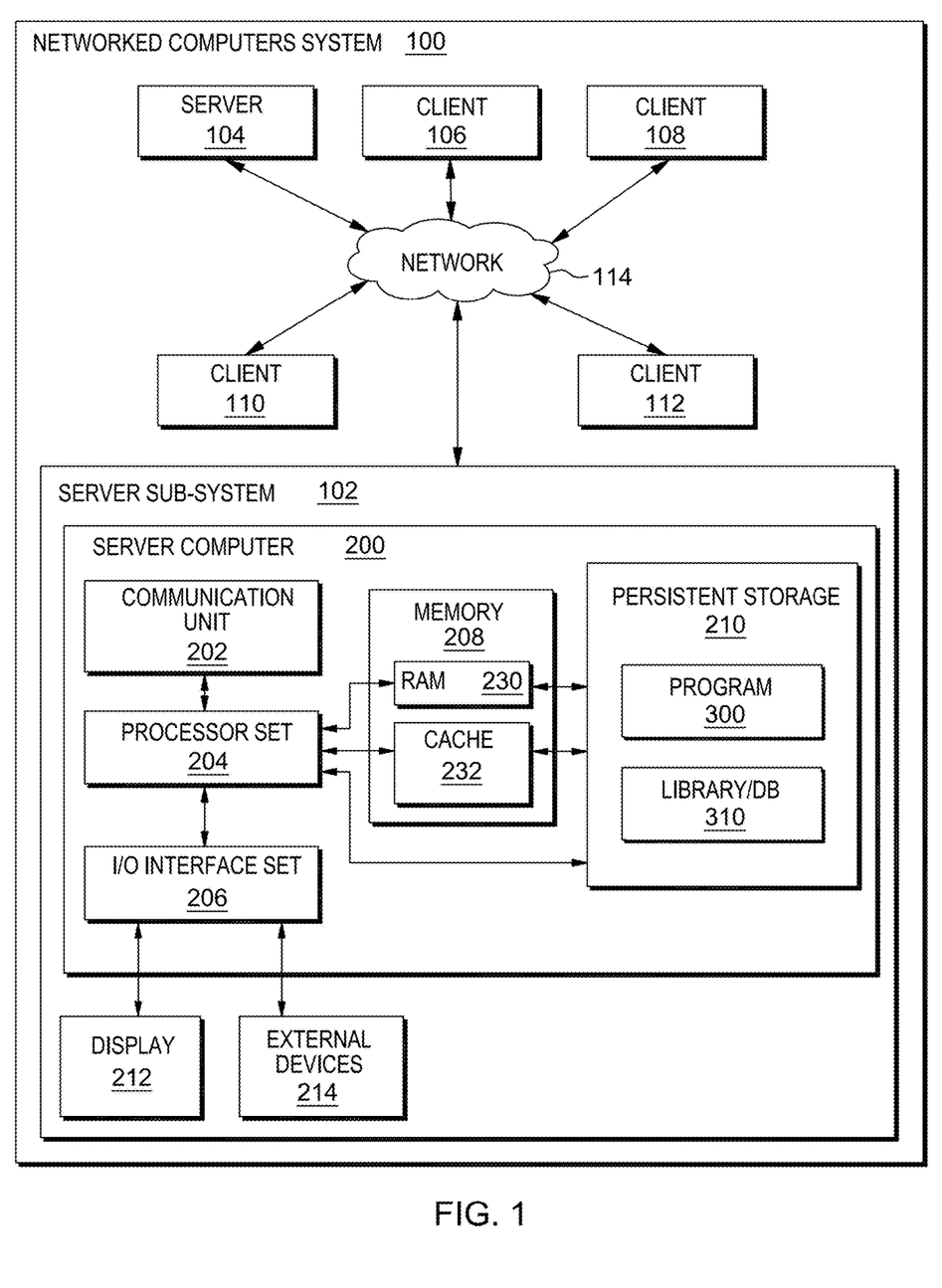
FIG. 1 is a block diagram view of a first embodiment of a system, according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; program 300; and library/database 310.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, program 300 can comprise digital replica (e.g., digital twin) simulation, supply chain routing, and/or the like. A library and/or database 310 may include substantive data associated with a plurality of digital twin models and may be accessed, for example by program 300, in utilizing (e.g., creating, monitoring, controlling, generating data, analyzing, simulating, etc.) one or more digital replica (e.g., digital twin) models. Additionally and/or alternatively, a library and/or database 310 may include substantive data associated with equipment, components, materials, products, industrial locations, and/or the like and may be accessed, for example by program 300, in simulating digital replica (e.g., digital twin) model operation, predicting events, mitigation and preventive maintenance determinations, and/or the like, such as discussed herein.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
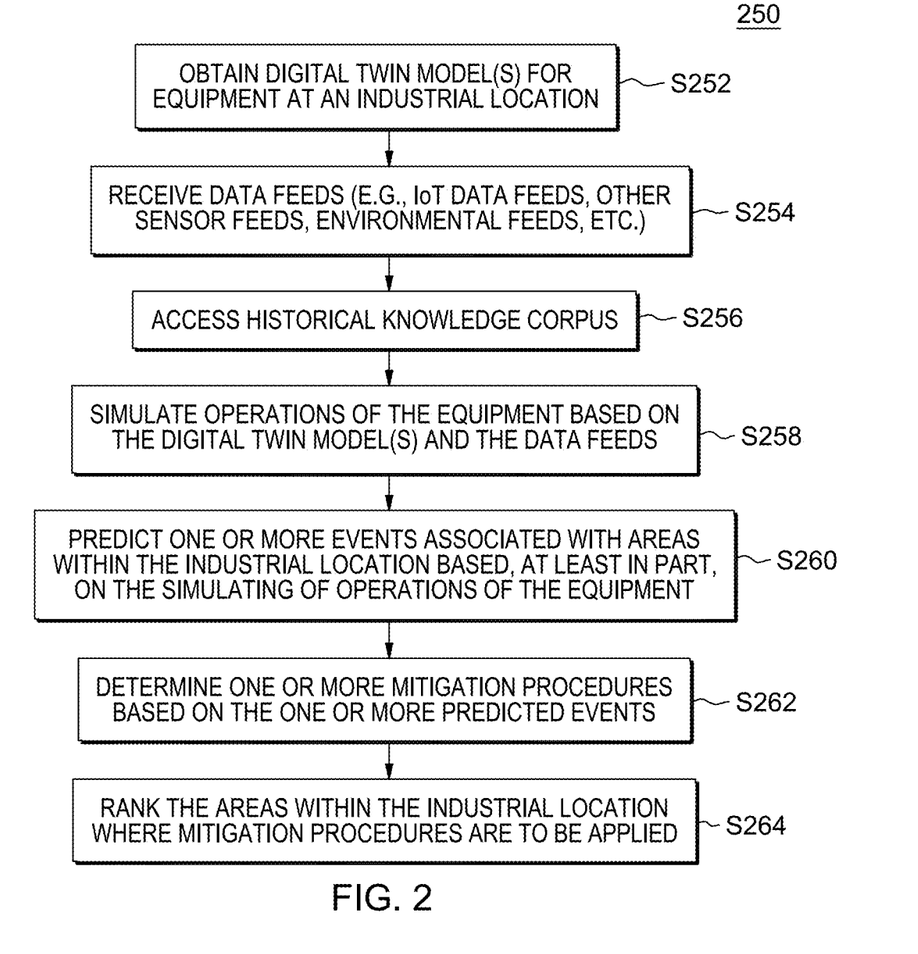
FIG. 2 is a flowchart showing a first embodiment method performed, at least in part, by the first embodiment system.
Figure 3:
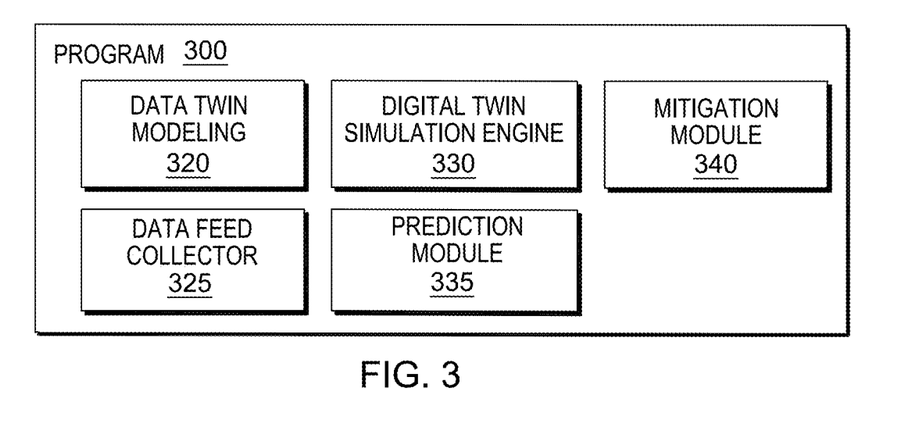
FIG. 3 is a block diagram showing an example machine logic (for example, software) portion of the first embodiment system.

FIG. 2 shows flowchart 250 depicting a computer-implemented method, according to an embodiment of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for predicting events associated with equipment in an industrial location (e.g., shop floor, manufacturing facility, engineering facility, machining facility, generation facility, etc.) begin at operation S252, where a computing system (e.g., server computer 200 of FIG. 1 or the like) obtains a digital replica (e.g., digital twin) model (e.g., digital replica of physical machines, objects, processes, systems, services, etc.) for the equipment (e.g., machines, assets, infrastructure, etc.) associated with the location. As an example, digital twin modeling module 320 of FIG. 3 and/or the like can access a digital replica (e.g., digital twin) library (e.g., library 310 of FIG. 1, etc.), identify data associated with each unit of equipment (e.g., bill of materials, model components, equipment specifications, moving parts, static structure, dimensions, material properties, mass, operation parameters, environmental parameters, etc.), and obtain (e.g., generate, retrieve, etc.) a digital replica (e.g., digital twin) model for each unit of equipment to provide for real-time simulation of the equipment and/or environment of the industrial location.

Processing proceeds to operation S254, where the computing system (e.g., server computer 200 of FIG. 1 or the like) obtains data feeds associated with the equipment (e.g., machines, assets, infrastructure, etc.) and/or surroundings. As an example, data feed collector module 325 and/or the like can provide for receiving data feeds associated with each unit of equipment at the location, associated with the environment, and/or the like. For example, each unit of equipment may have one or more Internet of Things (IoT) sensors (e.g., IoT sensors may be located at multiple points of the equipment, etc.). Additionally, in some embodiments, there may be one or more measurement devices (e.g., to measure static electricity in various equipment sections/surroundings, temperature, humidity, other environmental conditions/parameters, vibration, friction, liquid flow speed through pipes, etc.), one or more monitoring devices (e.g., microphones, etc.), and/or the like associated with the units of equipment and/or the location.

In some embodiments, the computing system may obtain acoustic feeds (e.g., from microphones installed at or near the equipment, etc.). In such embodiments, the computing system may use the acoustic feed(s) to detect sound associated with vibrations in relation to the equipment and/or surroundings. The computing system may use the data feed(s) (e.g., IoT, acoustic, etc.) to determine (e.g., in association with the digital replica models) how vibrations are propagating in the equipment environment, from media to media, and/or the like, and use such vibration data in simulating operations and/or predicting events associated with units of equipment and/or areas of the location (as discussed further below).

Optionally, in some embodiments, processing may proceed to operation S256, where the computing system (e.g., server computer 200 of FIG. 1 or the like) may access a historical knowledge corpus for use in simulating operations of the equipment (e.g., at operation S258) and/or predicting events associated the various equipment and/or areas within the industrial location (e.g., at operations S260). For example, in some embodiments, a historical knowledge corpus may be created, stored, updated, accessed, and/or the like by the computing system. The historical knowledge corpus may comprise historical data associated with data feeds (e.g., IoT feeds, other sensor feeds, etc.), historical simulation data associated with the equipment/surroundings (e.g., based on the digital replica models, etc.), historical event prediction data, historical mitigation data, data associated with the occurrence of events (e.g., generation of static electricity, leak, accident, etc.), and/or the like. In some embodiments, the computing system may use one or more machine-learned models to create and/or update the historical knowledge corpus based in part on the historical data and/or the like. The machine-learned model(s) may provide for including, within the knowledge corpus, data about the occurrence of events (e.g., generation of static electricity, leak, accident, etc.) with consideration for various operating parameters, environmental parameters, equipment conditions, and/or the like.

Processing proceeds to operation S258, where the computing system (e.g., server computer 200 of FIG. 1 or the like) can simulate the operation of the equipment and/or simulate the environment/surroundings of the equipment based, at least in part, on the digital replica (e.g., digital twin) models and the data feeds. For example, the digital replica (e.g., digital twin) simulation engine 330 and/or the like can use the data feeds associated with the equipment in association with the digital replica (e.g., digital twin) models for the equipment and/or environment/surroundings to simulate operations within the location. The computing system (e.g., via the digital twin simulation engine 330, etc.) can utilize the digital replica (e.g., digital twin) models and data feeds to simulate various operational conditions of the equipment, to simulate areas within the location/equipment surroundings, and/or the like as they relate to the occurrence of events to be predicted (e.g., generation of static electricity above a defined level, leak, accident, etc.) to facilitate mitigation, preventive measures, maintenance, and/or the like. For example, in some embodiments, the digital twin simulation engine 330 and/or the like can simulate operations of the various units of equipment, any manual activities to be performed, any human-machine interactions, and/or the like based on the digital replica (e.g., digital twin) models and the data feeds. In some embodiments, the computing system may use parameters (e.g., from data feeds, etc.) such as amount of friction, vibration, flow speed, environmental conditions (e.g., humidity, temperature, etc.), operational parameters (e.g., payload, power consumption, grounding, part damage, etc.), current conditions, and/or the like in simulating operations based on the digital replica (e.g., digital twin) models. In some embodiments, the computing system may also use a historical knowledge corpus in simulating the operations with regard to the occurrence of events to be predicted.

Processing proceeds to operation S260, where the computing system (e.g., server computer 200 of FIG. 1 or the like) can predict one or more events related to areas within the industrial location based, at least in part, on the digital replica (e.g., digital twin) model simulations of the equipment/surroundings. For example, the prediction module 335 and/or the like can predict one or more events (e.g., static electricity above a defined level, leak, accident, etc.) associated with a unit of equipment and/or area within the industrial location that may necessitate mitigation, preventive measures, maintenance, and/or the like to avoid the occurrence of the predicted event and/or reduce the level/severity of the predicted event. In some embodiments, the prediction of an event to be mitigated may include determining that a parameter associated with the equipment and/or the industrial location will exceed a defined level. For example, in the case of static electricity generation, predicting an event may include predicting that the generated static electricity will go above a defined level for static electricity safety. As another example, in the case of a leak, the predicting an event may include predicting that the amount of material being leaked may exceed a defined safe level.

Processing proceeds to operation S262, where the computing system (e.g., server computer 200 of FIG. 1 or the like) can determine one or more mitigation procedures based on the one or more predicted events. For example, the mitigation module 340 and/or the like can obtain data associated with the one or more predicted events and determine appropriate mitigation procedures to avoid the predicted event and/or reduce the severity/level of the predicted event. In some embodiments, the computing system can identify mitigation procedures such as controlling the operational workflow (e.g., halting an operation, stopping a machine, modifying a flow of liquid/gas, etc.) to avoid or reduce the level of the predicted event. For example, in some embodiments, the mitigation procedures may include sending signals and/or commands to various units of equipment to control the equipment operations. In some embodiments, the mitigation procedures may include determination and notification of recommended preventative maintenance for various units of equipment. In some embodiments, for example where a predicted event includes a leak, the mitigation procedures can be determined based on possible interactions and the occupancy footprint of the location (e.g., where facility personnel may be located). In some embodiments, the mitigation procedures may include notifying personnel of changes to facility exit plans, occupancy footprints, material handling, and/or the like in response to the predicted event.

Optionally, in some embodiments, processing may proceed to operation S264 where the computing system (e.g., server computer 200 of FIG. 1 or the like) may rank and/or prioritize the one or more areas within the industrial location and/or the one or more units of equipment where the mitigation procedures are to be applied. For example, the prediction module 335, mitigation module 340, and/or the like may rank and/or prioritize one or more of the predicted events based on one or more factors, such as type of predicted event, severity of predicted event, potential impact to operations, and/or the like so that the mitigation procedures can be performed as appropriate.

Further Comments and/or Embodiments

Figure 4:
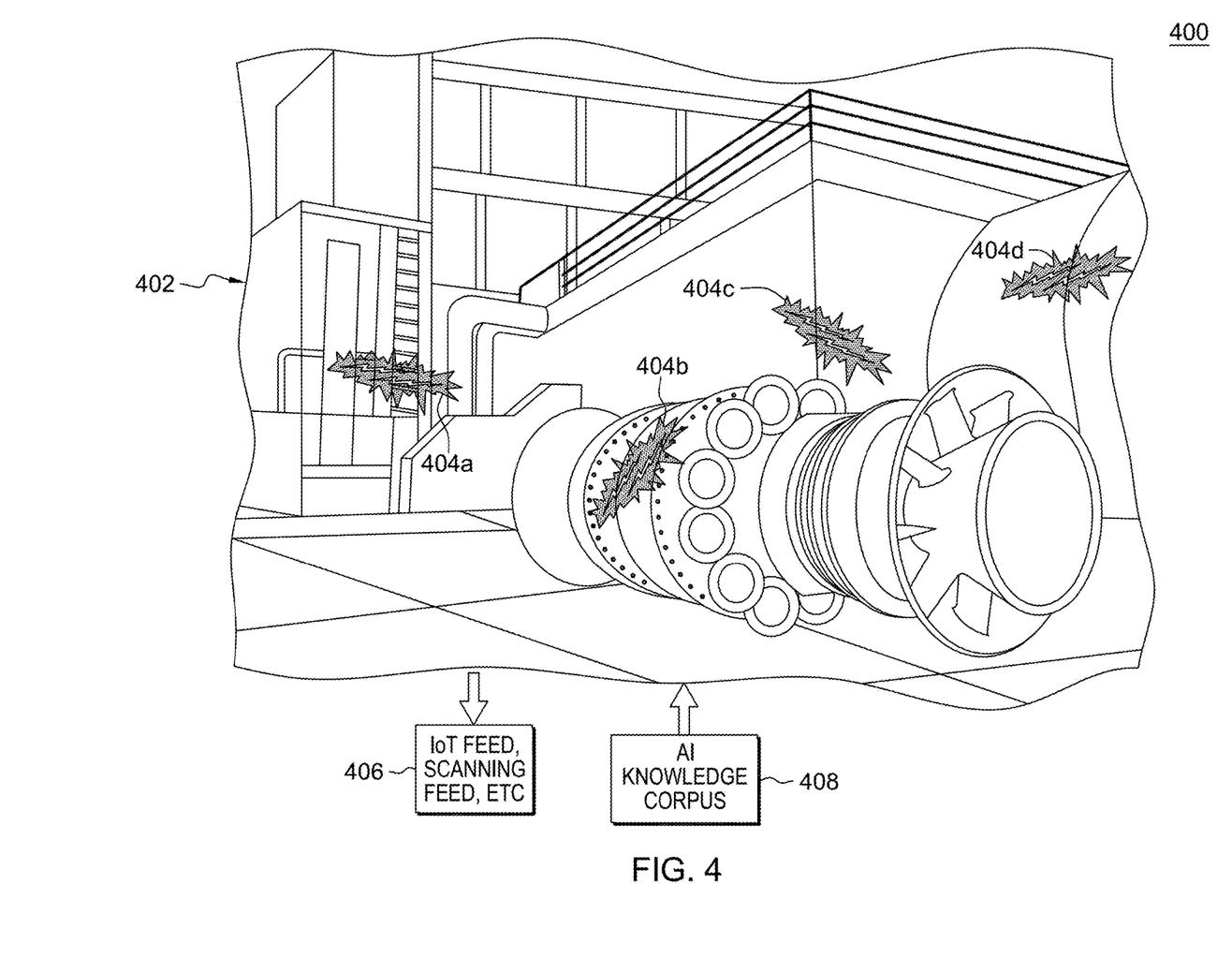
FIG. 4 is a schematic diagram showing an example of an industrial location simulation, according to the present invention.

FIG. 4 is a schematic diagram showing an example of an industrial location simulation and prediction 400, according to the present invention. As illustrated in FIG. 4, the example industrial location simulation and prediction 400 includes location diagram 402, predicted events 404a-404d, data feeds 406, and knowledge corpus 408. The location diagram 402 depicts a plurality of units of equipment (machines, assets, infrastructure, etc.) associated with the industrial location. The computing system can generate digital replica (e.g., digital twin) models for each unit of equipment at the industrial location, which can be utilized to simulate operation of the equipment associated with the location and generate event predictions, such as predicted events 404a-404d.

A plurality of sensors (e.g., IoT sensors, measurement sensors, etc.) are associated with the physical equipment at the industrial location. These sensors provide various data feeds, such as data feeds 406, to the computing system for use in conjunction with the digital replica (e.g., digital twin) models to simulate operations at the industrial location. These data feeds can include IoT sensors, environmental sensors, measurement sensors, and/or the like. Based in part on the data feeds from the location, the computing system can simulate the operation of the equipment using the digital replica (e.g., digital twin) models and generate predictions of events that may occur at areas within the industrial location, as shown by predicted events 404a-404d. The location diagram 402 depicts predicted events 404a-404d and indicates the areas where the predicted events may occur.

As one example, embodiments of the present disclosure can be used to monitor an industrial location to predict events that may require mitigation, such as buildup of static electricity, as depicted in FIG. 4. A computing system (e.g., server computer 200 of FIG. 1 or the like) can obtain data feeds from various sensors (e.g., data feeds 406, etc.) associated with the industrial location, and in some embodiments, historical event data from a knowledge corpus (e.g., AI knowledge corpus 408, etc.) to simulate the environment and equipment associated with the industrial location (e.g., via a digital twin modeling module 320, digital twin simulation engine 330, and/or the like), such as depicted in location diagram 402. Static electricity, basically an imbalance of electric charges within or on the surface of a material, can be generated in a variety of ways in an industrial environment and can sometimes lead to events that may negatively affect the industrial location (e.g., damage equipment/assets, cause work shutdowns, contribute to physical harm, etc.). For example, static electricity can be generated when two surfaces come in contact and separate with at least one of the surfaces being an electric insulator; by vibration such as when a part is loose fitting; by flowing movement of fluids or finely powered substances in pipes; by rubbing two non-conductive objects together; and/or the like. Additionally, static electricity can often be generated and/or buildup in low humidity environments (e.g., seasons when the air is dry, etc.).

As illustrated in FIG. 4, the computing system can obtain digital replica (e.g., digital twin) models of a variety of equipment in an industrial location to provide simulations of the operations associated with the industrial location, such as in simulation 400. The computing system can obtain data feeds associated with the equipment to be used in simulating operations with the digital replica models. For example, some units of equipment may have IoT sensors in various positions that can provide current operating data associated with the equipment such that the activities performed by the equipment can be simulated with the digital replica models to predict events. As an example, sensor data feeds can be providing information associated with flows through pipelines, component movement, grounding components, operating parameters, and/or the like, that can be used in simulating operations to predict events. Additionally, IoT sensors, environmental sensors, and/or the like positioned within the industrial location can provide data feeds associated with the operating environment to provide environmental conditions that may contribute to the occurrence of events. For example, data feeds from acoustic sensors within the location can be combined with IoT sensor data feeds to identify and/or track sounds associated with component vibrations, vibration propagation between components and/or different media, and/or the like to identify conditions that may contribute to the buildup of static electricity. As another example, data feeds from environmental sensors may provide current environmental conditions, such as low humidity for example, that may contribute to the buildup of static electricity.

For example, as illustrated in FIG. 4, the computing system can use the data feeds from sensors and the digital replica models to simulate operations and identify a grounding issue with a unit of equipment, low humidity, and a buildup of static electricity approaching a threshold to predict a possible event 404a that may require mitigation. In some embodiments, the computing system can identify predicted event 404a and determine operational workflow changes to mitigate the predicted event 404a, such as halting an operation, identifying preventative maintenance, and/or the like.

Additionally, the computing system can simulate operations at a different unit of equipment (e.g., turbine components) and, for example, identify increasing vibrations attributed to improper contact of component surfaces (e.g., rubbing components) in the unit of equipment and predict an event 404b associated with an increase of static electricity buildup in the equipment.

The computing system may also simulate operations associated with a pipeline system (e.g., not shown) using sensor data feeds associated with flows within the pipeline system. The digital replica simulation may identify an increase of electrostatic charge of the flowing media through a portion of the pipeline system and predict an event 404c that may be caused by a buildup of static electricity above a threshold amount. The computing system may identity and/or institute operational workflow changes such as reducing the flow through that portion of the pipeline system to mitigate the predicted event 404c.

In some embodiments, the computing system may determine priorities for the predicted events (e.g., predicted events 404a, 404b, 404c, etc.) to recommend appropriate mitigation actions. For example, using the digital replica simulations, the computing system may determine that the predicted event 404b is likely to be a significant buildup of static electricity more likely to contribute to damage, and therefore recommend and/or institute mitigation procedures immediately to address predicted event 404b. The computing system may determine that the predicted event 404a is likely to be a lower level and/or intermittent static electricity buildup, and thus set a lower priority for mitigation such as preventative maintenance.

In some embodiments, as illustrated in FIG. 4, the computing system may access a knowledge corpus 408 which can be used in the simulation of operations based on the digital replica (e.g., digital twin) models and the prediction of events associated with the equipment and location. The simulation data and the predicted event data, such as shown in location diagram 402, can be provided to the knowledge corpus 408 for use in creating and updating the knowledge corpus 408. Additionally, the data feeds 406 can be provided to the knowledge corpus. In some embodiments, the historical data associated with simulations and predictions as well as the historical data feed data can be used with machine-learned models to update the knowledge corpus regarding the simulation and occurrence of events with consideration for various operating parameters, environmental parameters, current conditions of the equipment, and/or the like. The knowledge corpus can be utilized with the digital replica (e.g., digital twin) models and data feeds in the simulation of the equipment and/or surroundings and the prediction of events that should be mitigated.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    obtaining, by one or more processors, one or more digital replica models for each unit of equipment at an industrial location;
    receiving, by the one or more processors, a set of data from data feeds associated with each unit of the equipment;
    simulating, by the one or more processors, operations of each unit of the equipment based on the one or more digital replica models and the set of data from the data feeds;
    identifying, by the one or more processors, a grounding issue associated with the operations of each unit of the equipment causing a buildup of static electricity that is approaching a threshold amount;
    responsive to the buildup of static electricity reaching the threshold amount, predicting, by the one or more processors, one or more events associated with one or more areas within the industrial location based, at least in part, on the simulating of the operations of each unit of the equipment; and
    determining, by the one or more processors, one or more mitigation procedures for the one or more predicted events, wherein the one or more mitigation procedures includes controlling operational workflows associated with one or more areas within the industrial location by halting the operations of each unit of the equipment that may require mitigation or modifying a flow of a liquid or a gas.

2. The computer-implemented method of claim 1, further comprising:
    obtaining, by the one or more processors, a set of historical data about an occurrence of one or more historical events from a historical knowledge corpus for use in simulating the operations of each unit of the equipment, identifying the grounding issue associated with the operations of each unit of the equipment, and predicting the one or more events associated with the one or more areas within the industrial location.

3. The computer-implemented method of claim 1, further comprising:
    ranking, by the one or more processors, the one or more areas within the industrial location where the one or more mitigation procedures are to be applied based on one or more factors, wherein the one or more factors include a type of an event predicted, a severity of the event predicted, and a potential impact on operations that will be caused by the one or more predicted events.

4. The computer-implemented method of claim 1, wherein the data feeds associated with each unit of the equipment comprise Internet of Things data feeds, environmental sensor data feeds, measurement sensor data feeds, acoustic data feeds, and other sensor data feeds associated with the industrial location.

5. The computer-implemented method of claim 1, further comprising:
    storing, by the one or more processors, data associated with simulating the operations of each unit of the equipment and data associated with predicting the one or more events in the historical knowledge corpus; and updating, by the one or more processors, the historical knowledge corpus with the data associated with simulating the operations of each unit of the equipment and the data associated with predicting the one or more events.

6. The computer-implemented method of claim 1, wherein determining the one or more mitigation procedures for the one or more predicted events further comprises:
determining, by the one or more processors, preventive maintenance for the one or more areas associated with the one or more predicted events.

7. The computer-implemented method of claim 1, wherein simulating the operations of each unit of the equipment based on the one or more digital replica models and the set of data from the data feeds further comprises:
simulating, by the one or more processors, an amount of static electricity generated in the one or more areas within the industrial location where the one or more mitigation procedures are to be applied; and
predicting, by the one or more processors, the amount of static electricity generated above a defined level.

8. The computer-implemented method of claim 7, wherein simulating the amount of static electricity generated in the one or more areas within the industrial location where the one or more mitigation procedures are to be applied is based, at least in part, on identifying current conditions of the equipment, operational parameters, and environmental parameters in association with digital replica model simulations.

9. A computer program product comprising a computer readable storage medium having stored thereon:
program instructions programmed to obtain one or more digital replica models for each unit of equipment at an industrial location;
program instructions programmed to receive a set of data from data feeds associated with each unit of the equipment;
program instructions programmed to simulate operations of each unit of the equipment based on the one or more digital replica models and the set of data from the data feeds;
program instructions programmed to identify a grounding issue associated with the operations of each unit of the equipment causing a buildup of static electricity that is approaching a threshold amount;
responsive to the buildup of static electricity reaching the threshold amount, program instructions programmed to predict one or more events associated with one or more areas within the industrial location based, at least in part, on the simulating of the operations of each unit of the equipment; and
program instructions programmed to determine one or more mitigation procedures for the one or more predicted events, wherein the one or more mitigation procedures includes controlling operational workflows associated with one or more areas within the industrial location by halting the operations of each unit of the equipment that may require mitigation or modifying a flow of a liquid or a gas.

10. The computer program product of claim 9, the computer readable storage medium having further stored thereon:
program instructions programmed to obtain a set of historical data about an occurrence of one or more historical events from a historical knowledge corpus for use in simulating the operations of each unit of the equipment, identifying the grounding issue associated with the operations of each unit of the equipment, and predicting the one or more events associated with the one or more areas within the industrial location.

11. The computer program product of claim 9, wherein the data feeds associated with each unit of the equipment comprise Internet of Things data feeds, environmental sensor data feeds, measurement sensor data feeds, acoustic data feeds, and other sensor data feeds associated with the industrial location.

12. The computer program product of claim 9, wherein simulating the operations of each unit of the equipment based on the one or more digital replica models and the set of data from the data feeds further comprises:
program instructions programmed to simulate an amount of static electricity generated in the one or more areas within the industrial location where the one or more mitigation procedures are to be applied; and
program instructions programmed to predict the amount of static electricity generated above a defined level.

13. A computer system comprising:
a processor set; and
a computer readable storage medium;
wherein:
the processor set is structured, located, connected and programmed to run program instructions stored on the computer readable storage medium; and
the stored program instructions include:
program instructions programmed to obtain one or more digital replica models for each unit of equipment at an industrial location;
program instructions programmed to receive a set of data from data feeds associated with each unit of the equipment;
program instructions programmed to simulate operations of each unit of the equipment based on the one or more digital replica models and the set of data from the data feeds;
program instructions programmed to identify a grounding issue associated with the operations of each unit of equipment causing a buildup of static electricity that is approaching a threshold amount;
responsive to the buildup of static electricity reaching the threshold amount, program instructions programmed to predict one or more events associated with one or more areas within the industrial location based, at least in part, on the simulating of the operations of each unit of the equipment; and
program instructions programmed to determine one or more mitigation procedures for the one or more predicted events, wherein the one or more mitigation procedures includes controlling operational workflows associated with one or more areas within the industrial location by halting the operations of each unit of the equipment that may require mitigation or modifying a flow of a liquid or a gas.

14. The computer system of claim 13, wherein the stored program instructions further include:
program instructions programmed to obtain a set of historical data about an occurrence of one or more historical events from a historical knowledge corpus for use in simulating the operations of each unit of the equipment, identifying the grounding issue associated with the operations of each unit of the equipment, and predicting the one or more events associated with the one or more areas within the industrial location.

15. The computer system of claim 13, wherein the data feeds associated with each unit of the equipment comprise Internet of Things data feeds, environmental sensor data feeds, measurement sensor data feeds, acoustic data feeds, and other sensor data feeds associated with the industrial location.

16. The computer system of claim 13, wherein the stored program instructions further include:
   program instructions programmed to store data associated with simulating the operations of each unit of the equipment and data associated with predicting the one or more events in the historical knowledge corpus; and
   program instructions programmed to update the historical knowledge corpus with the data associated with simulating the operations of each unit of the equipment and the data associated with predicting the one or more events.

17. The computer system of claim 13, wherein simulating the operations of each unit of the equipment based on the one or more digital replica models and the set of data from the data feeds further comprises:
   program instructions programmed to simulate an amount of static electricity generated in the one or more areas within the industrial location where the one or more mitigation procedures are to be applied; and
   program instructions programmed to predict the amount of static electricity generated above a defined level.

* * * * *